United States Patent
Malkhi et al.

(10) Patent No.: US 7,849,223 B2
(45) Date of Patent: Dec. 7, 2010

(54) VIRTUALLY SYNCHRONOUS PAXOS

(75) Inventors: Dahlia Malkhi, Palo Alto, CA (US);
Leslie B. Lamport, Palo Alto, CA (US);
Lidong Zhou, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 11/952,133

(22) Filed: Dec. 7, 2007

(65) Prior Publication Data

US 2009/0150566 A1 Jun. 11, 2009

(51) Int. Cl.
*G06F 15/16* (2006.01)
(52) U.S. Cl. .......................................... 709/248; 714/12
(58) Field of Classification Search ................ 709/248; 714/12, 13, 25, 39, 49
See application file for complete search history.

(56) References Cited

U.S. PATENT DOCUMENTS

| | | | |
|---|---|---|---|
| 5,261,085 A | | 11/1993 | Lamport |
| 6,279,032 B1 * | | 8/2001 | Short et al. .................. 709/209 |
| 6,360,331 B2 * | | 3/2002 | Vert et al. ...................... 714/4 |
| 6,453,426 B1 * | | 9/2002 | Gamache et al. ............... 714/4 |
| 6,463,532 B1 | | 10/2002 | Reuter et al. |
| 6,826,601 B2 | | 11/2004 | Jacobs et al. |
| 6,834,303 B1 * | | 12/2004 | Garg et al. .................. 709/224 |
| 6,904,448 B2 * | | 6/2005 | Johnson et al. ............. 709/201 |
| 6,938,084 B2 | | 8/2005 | Gamache et al. |
| 7,016,946 B2 * | | 3/2006 | Shirriff ....................... 709/221 |
| 7,191,357 B2 * | | 3/2007 | Holland et al. .................. 714/5 |
| 7,249,280 B2 | | 7/2007 | Lamport et al. |
| 7,496,782 B1 * | | 2/2009 | Kownacki ...................... 714/4 |
| 7,555,516 B2 * | | 6/2009 | Lamport ..................... 709/201 |
| 7,636,868 B2 * | | 12/2009 | Hoffman et al. .............. 714/13 |
| 2005/0256824 A1 | | 11/2005 | Vingralek |
| 2005/0283644 A1 | | 12/2005 | Lorch et al. |
| 2006/0090095 A1 * | | 4/2006 | Massa et al. ................... 714/4 |
| 2006/0136781 A1 * | | 6/2006 | Lamport ..................... 714/25 |
| 2006/0168011 A1 | | 7/2006 | Lamport |
| 2007/0156842 A1 | | 7/2007 | Vermeulen et al. |

OTHER PUBLICATIONS

Birman, et al., "How the Hidden Hand Shapes the Market for Software Reliability", Date: Jun. 2006, pp. 1-8.
Birman, et al., "Exploiting virtual synchrony in distributed systems", Proceedings of the eleventh ACM Symposium on Operating Systems Principles, Date: 1987, pp. 123-138.
Lampson Butler W., "How to Build a Highly Available System Using Consensus", pp. 1-17.

* cited by examiner

*Primary Examiner*—Saleh Najjar
*Assistant Examiner*—Marie Georges Henry

(57) ABSTRACT

A variant of Paxos is referred to as Virtually Synchronous Paxos (VS Paxos). VS Paxos is a self-reconfigurable protocol that allows for delay only for reconfiguration decisions, without placing an artificial limit on regular decisions. In an implementation of VS Paxos, subject to any restriction on reconfiguration decisions, a leader may activate an unbounded number of consensus instances ahead. A VS Paxos technique permits unlimited progress during stability periods, in that a leader may initiate commands at any number of consensus instances without bound. VS Paxos waits for command completion only when configuration-changing commands occur.

20 Claims, 8 Drawing Sheets

VIRTUALLY SYNCHRONOUS PAXOS

BACKGROUND

Distributed computing systems can be difficult to maintain due to the complexity of properly synchronizing the individual devices that comprise the system. Because time-keeping across individual processes can be difficult at best, a replicated state machine approach is often used to coordinate activity among the individual devices.

A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order.

Therefore, to synchronize one state machine to another, a determination of the commands performed by the other state machine needs to be made. The determination of commands is separate from their execution by the state machine. In particular, decision making can be performed simultaneously for multiple commands, whereas commands are executed sequentially by state machines. The problem of synchronization thus becomes a problem of determining the order of the commands performed, or, more specifically, determining the particular command performed for a given step.

Determining the commands is the heart of known solutions like the Paxos protocols. A set of servers is used to form decisions in a fault tolerant manner, as well as to maintain a record of the past decisions despite failures. Designated subsets of this server-set, called quorums, can form decisions and store them. In a reconfigurable system, the quorum-set is modifiable. A self-reconfigurable state machine controls the quorum set as part of the state it maintains. Configuration-changing commands are part of the state-machine commands.

SUMMARY

A variant of Paxos is referred to as Virtually Synchronous Paxos (VS Paxos). VS Paxos is a self-reconfigurable protocol that allows for delay only for reconfiguration decisions, without placing an artificial limit on regular decisions. In an implementation of VS Paxos, subject to any restriction on reconfiguration decisions, a leader may activate an unbounded number of consensus instances ahead. A VS Paxos technique permits unlimited progress during stability periods, in that a leader may initiate commands at any number of consensus instances without bound. VS Paxos waits for command completion only when configuration-changing commands occur.

In an implementation, a reconfiguration decision determines the quorum set for the next command. If the contents of a decision k change the configuration, then the new configuration becomes effective at command k+1 and onward. A leader that proposes a reconfiguration decision waits until the decision is determined in order to move to the next command and, with it, to the new configuration. VS Paxos does not place any bound on progress horizon, and reconfiguration decisions take effect immediately.

In an implementation, a configuration has a leader which sets an order on updates. When a configuration changes, the current configuration is suspended from further activity. The leader of the new configuration first reconciles the state of all surviving nodes, and then moves to enable the new configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
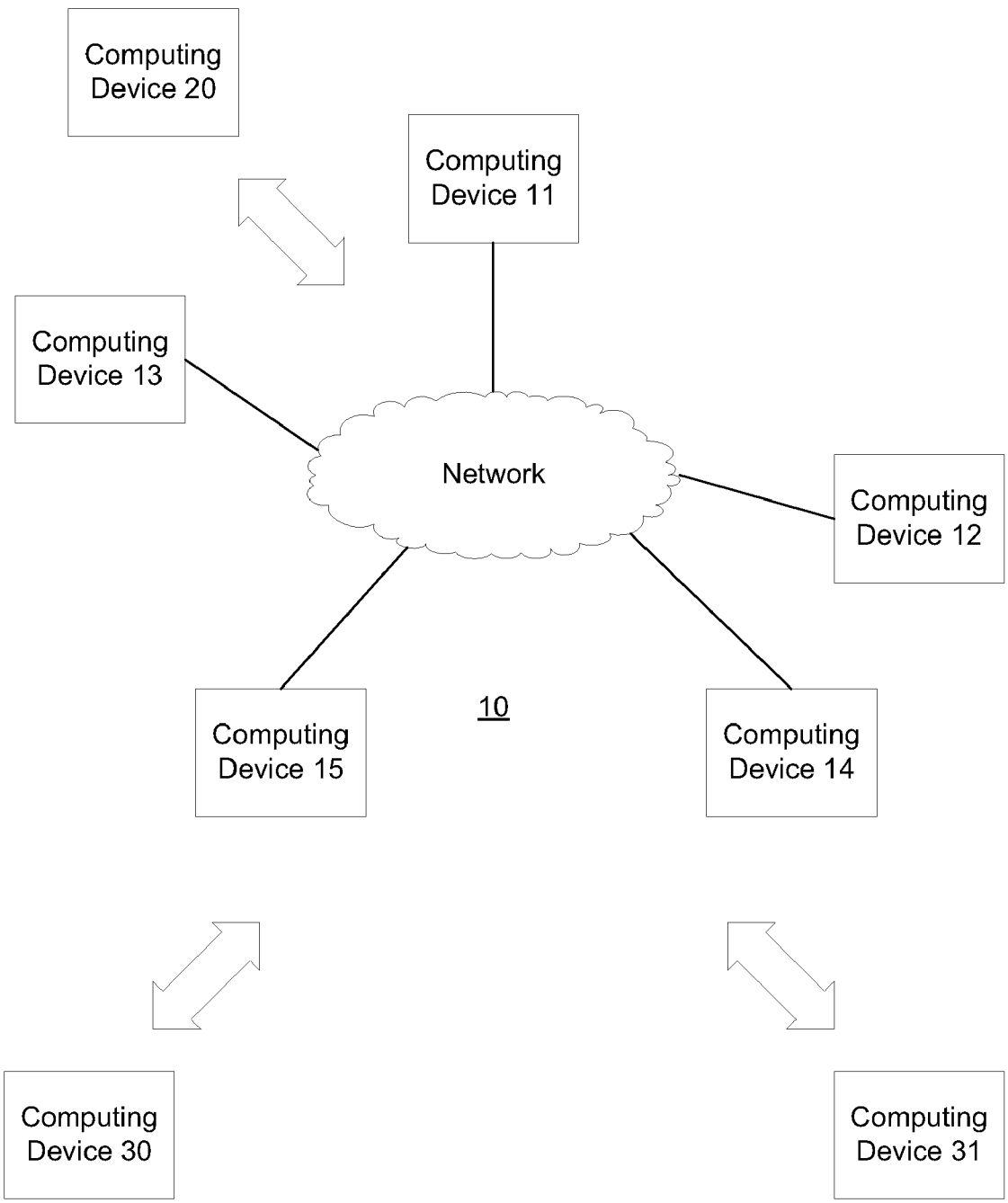
FIG. 1 is a block diagram illustrating an exemplary distributed computing environment.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be used for the devices to aggregate their capabilities and storage space and, as a result, each device may contain a copy. Synchronization of the information among the devices of the system can be facilitated through a state machine approach such as described herein.

Alternatively, an increasingly common usage for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide access to information and other services to clients.

Such a distributed computing system can be thought of as a state machine, with the future state of the machine defined by the current state and the action to be taken. Each constituent device of the distributed computing system can then independently execute the state machine of the overall system. The state machine approach can be implemented asynchronously, so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can have the same state and if a device fails it need only determine the last function it executed, identify from the list any functions that have been agreed upon since that last function, and execute those functions.

A distributed computing system acting as a server can be especially useful for serving a large amount of information to a diverse set of clients, such as a central database for a multinational corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos protocol. In the Paxos protocol, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

The Paxos protocol requires a set of computing devices to tolerate failures. Specifically, to tolerate F number of failures, the protocol requires a distributed computing system comprising at least 2F+1 number of computing devices. Of these devices, only a simple majority is needed to select commands and continue proper operation of the system. The remaining devices can remain unused until one of the devices selecting commands and operating the system fails.

Turning to the drawings, wherein like reference numerals refer to like elements, an implementation is described with respect to a distributed computing system, such as the exemplary distributed computing system 10 shown in FIG. 1. The system 10 comprises computing devices 11 through 15, interconnected as shown. As will be understood by those skilled in the art, the aspects described herein are applicable to all distributed computing environments and are not intended to be limited in any way by the exemplary distributed computing system of FIG. 1, which has been simplified for presentation purposes.

FIG. 1 also illustrates a single client computing device 20, though an environment having any number of client computing devices is contemplated. Client computing device 20 is illustrated as having a generic communication connection to the distributed computing system 10. As will be known by those skilled in the art, such a communication connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communication connection can use any communication medium and protocol, and can allow the computing devices 30 and 31 to communicate with one or more of the computing devices in the distributed computing system 10. Computing devices 30 and 31 can learn of the results of executions performed by the system 10 without being part of the system 10. Alternatively, computing devices 30 and 31 can learn of functions selected by the system 10 and can execute the function themselves, thereby independently maintaining the same state as the devices in the system 10.

Figure 2:
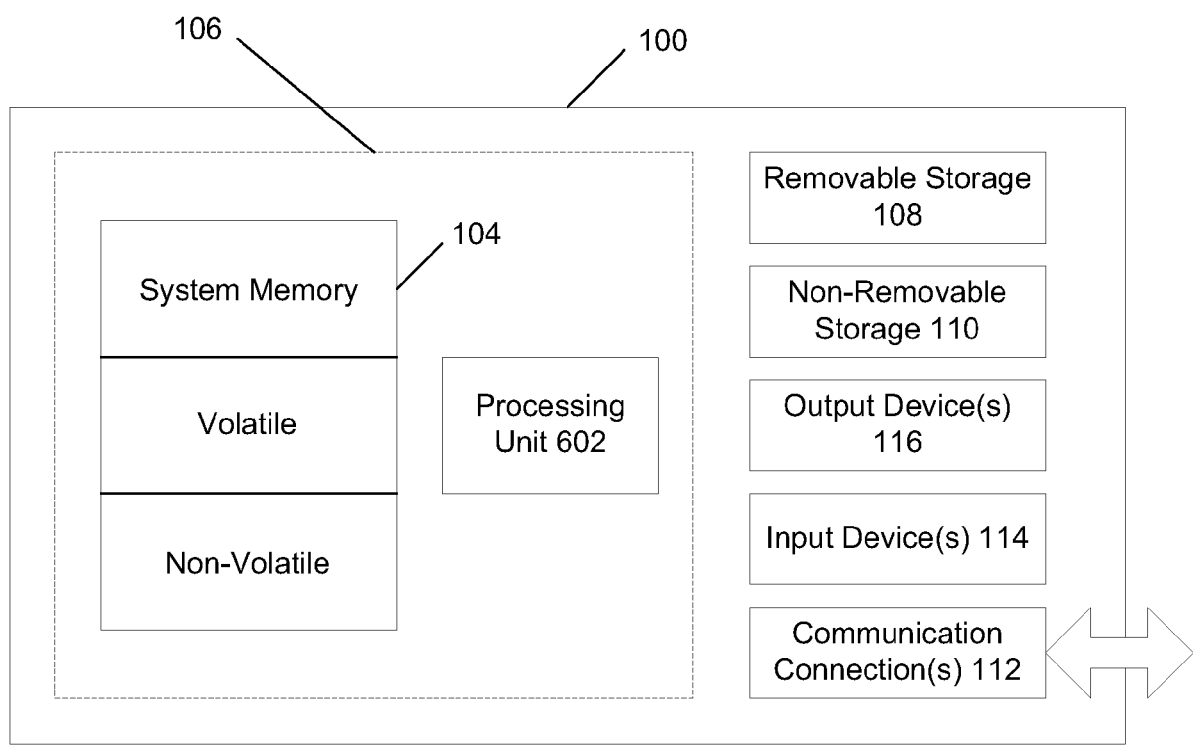
FIG. 2 shows an exemplary computing environment.

FIG. 2 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106.

Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes a variety of computer readable media. Computer readable media can be any available media that can be accessed by device 100 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 104, removable storage 108, and non-removable storage 110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may contain communications connection(s) 112 that allow the device to communicate with other devices. Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Further to the above, Paxos is a formally proven protocol for maintaining a linearizable object in a system with crash failures. Paxos achieves resilience by forming a sequence of agreement decisions on updates to be applied to the object, one by one, by each replica, and implements the well-known Replicated State Machine approach. Each agreement decision is reached among the set of servers using a fault tolerant, quorum-based consensus protocol. In Static Paxos, the set of servers and quorums is predetermined for all agreement instances. But in order to support long-term fault tolerance, a replicated state machine should allow the removal of faulty nodes and the reintroduction of servers into the system.

The replicated state machine itself may store the configuration as part of its mutable state. Reconfigurable Paxos utilizes consensus decisions themselves, within the regular sequence of decisions, to form agreement on new quorum sets. This may be thought of as having the configuration being a part of the state that is maintained by the state machine. The configuration has an initial value, which is fixed initially and is known to all replicas, and then it is modified in a consistent manner by configuration-changing commands.

Since the configuration is itself modifiable, one specifies the quorum set used for any particular consensus instance in Reconfigurable Paxos as follows. In order to determine the quorum set responsible for instance k in the sequence decisions, one first learns the decision value for position k−α, where α is a parameter set by a user such as an administrator or operator. The correctness and consistency of the dynamic replicated state machine follows from the standard features of the Paxos protocol.

A consequence is that each machine waits for the decision k−α before proceeding with decision k. In particular, even during normal operation, a leader delays progressing into instance k until all decisions prior to k−α are determined. It is noted that forming agreement decisions and applying agreement decisions are not the same. Decisions are deployed in sequence order for linearizability, but in the decision-making process, which may be time consuming, proposals may be injected in a pipeline and work concurrently on multiple instances in the sequence.

In Reconfigurable Paxos, in a situation when a leader passes a reconfiguration degree at instance m, the reconfiguration takes effect only α instances ahead, starting at instance m+α. To expedite activation of the new configuration, the leader may fill in α positions in the sequence with blank decisions. It can do so simultaneously for the relevant consensus instances, using one message round to a quorum in the current configuration. It then proceeds with the new configuration, starting with command m+α and onward.

Virtual Synchrony is a known concept using intuitive notions and deals with reconfigurable replication without a serialization barrier. It builds a dynamically reconfigurable storage system in terms of a sequence of configurations. Each configuration passes a sequence of updates on data, until reconfiguration. The next reconfiguration starts only after the state of the previous one is reconciled. It is noted that such intuitive properties are not kept by Reconfigurable Paxos.

The Paxos protocol and Reconfigurable Paxos in particular support long-term fault tolerance by removing nodes and re-introducing new incarnations into the quorum-set. In Reconfigurable Paxos, in order to determine the quorum set for decision k+α, where α is a system parameter, the decision value for index k is known. A variation is described herein in which a leader is free to operate arbitrarily far ahead in the sequence of consensus decisions, without bounds. Furthermore, as described further herein, a reconfiguration decree takes effect immediately; that is, if decision k contains a new quorum set, then this quorum set becomes responsible for decision k+1 and onward, up until a new reconfiguration.

A variant of Reconfigurable Paxos is referred to as Virtually Synchronous Paxos (VS Paxos). As described further herein, VS Paxos is a self-reconfigurable protocol that allows for delay only for reconfiguration decisions, without placing an artificial limit on regular decisions.

In an implementation of VS Paxos, subject to any restriction on reconfiguration decisions, a leader may activate an unbounded number of consensus instances ahead. In other words, a VS Paxos technique permits unlimited progress during stability periods, in that a leader may initiate commands at any number of consensus instances without bound. This is equivalent to setting α=∞ in Reconfigurable Paxos, so in effect, there is no α parameter in VS Paxos. VS Paxos waits for command completion only when configuration-changing commands occur.

A reconfiguration decision determines the quorum set for the next command. That is, if the contents of decision k change the configuration, then the new configuration becomes effective at command k+1 and onward. A leader that proposes a reconfiguration decision waits until the decision is determined in order to move to the next command and, with it, to the new configuration. In other words, a reconfiguration decision at instance k determines the quorum sets from instance k+1 onward, until the next reconfiguration decision. This would be equivalent to setting $\alpha=1$ for configuration-changing commands. Thus, VS Paxos does not place any bound on progress horizon, and reconfiguration decisions take effect immediately.

In an implementation, a configuration has a leader which sets an order on updates. When a configuration changes, the current configuration is suspended from further activity. The leader of the new configuration first reconciles the state of all surviving nodes, and then moves to enable the new configuration.

Figure 3:
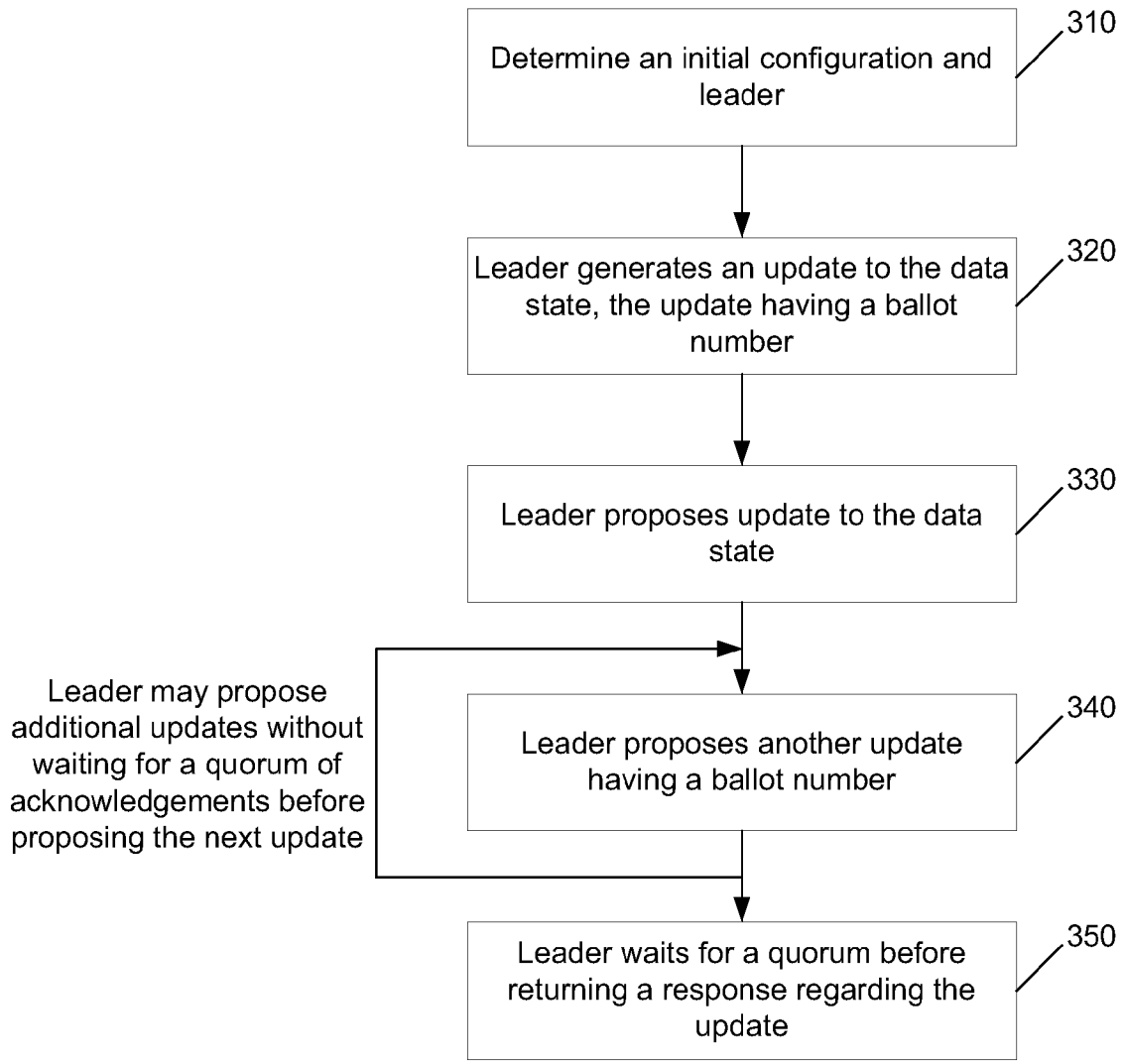
FIG. 3 is an operational flow of an implementation of a method that may be used in updating with Virtually Synchronous Paxos.

FIG. 3 is an operational flow of an implementation of a method 300 that may be used in updating with Virtually Synchronous Paxos. At operation 310, an initial configuration and a leader are determined. During the lifetime of the configuration, at operation 320, the leader generates an update to the data state. The update has a ballot number. At operation 330, the leader proposes the update to the data state.

At some point, at operation 340, the leader proposes another update having a ballot number, and may continue to do so in order, one update after another. The leader does not need to wait for a quorum of acknowledgements on an update before proposing the next one. The ballot number determines the ordering between them. The leader does wait for a quorum of acknowledgements before returning a response to the client that requested an update, at operation 350.

Figure 4:
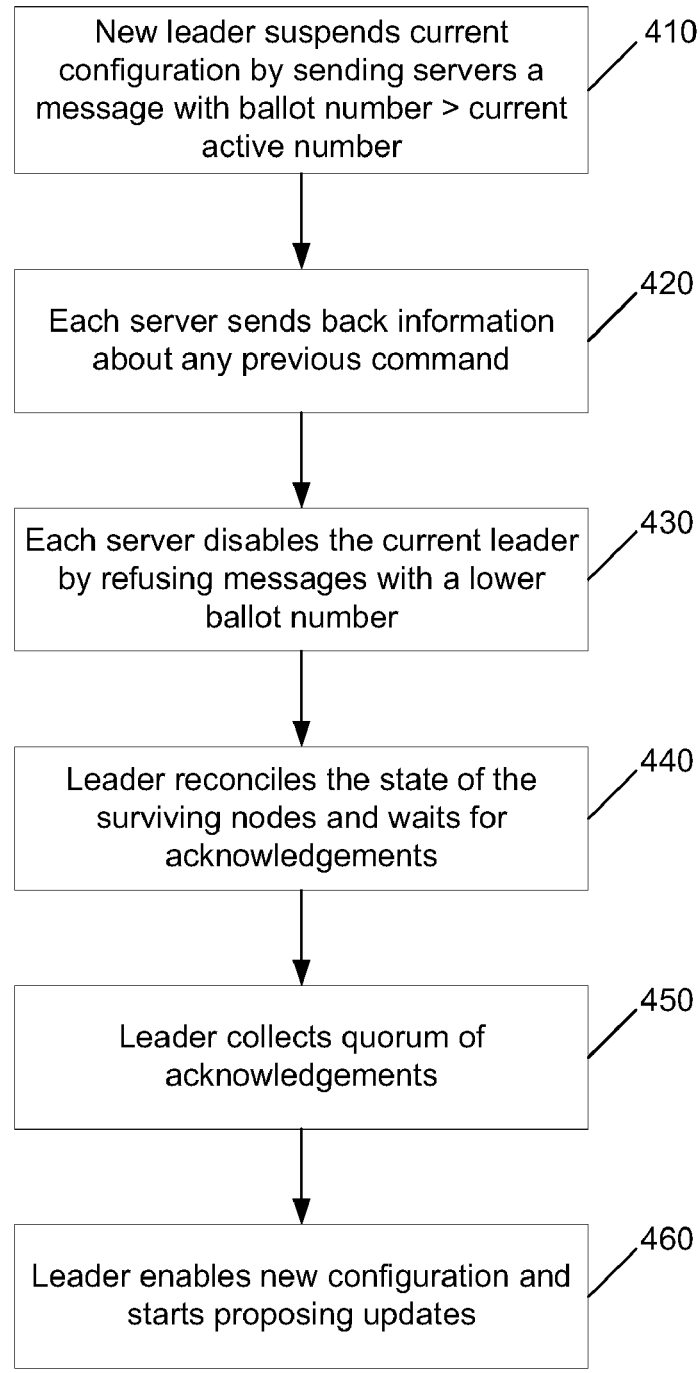
FIG. 4 is an operational flow of an implementation of a method that may be used in reconfiguration with Virtually Synchronous Paxos.

FIG. 4 is an operational flow of an implementation of a method 400 that may be used in reconfiguration with Virtually Synchronous Paxos. With respect to a reconfiguration, a new leader suspends the current configuration by sending the servers a message with a ballot number greater than the current active number at operation 410, thereby disabling the current ballot. In response, information about the state of the surviving nodes is collected. At operation 420, each server sends back information about any previous command, and at operation 430, each server disables the current leader by refusing messages with a lower ballot number.

The leader reconciles the state of the surviving nodes and waits for acknowledgements, at operation 440. After collecting a quorum of acknowledgements at operation 450, the leader enables the new configuration and starts proposing updates at operation 460.

VS Paxos tags every command with the configuration in which it was initiated, and permits commands to be chosen only within the scope of the configuration they were sent in. In an implementation, for example, a command d proposed in configuration c is considered as chosen only when a quorum in c votes for it, and not a quorum in any different configuration c'. For example, suppose that an initial configuration is {A,B,C}. Consider the following scenario. A votes for command d at instance n using configuration c. It may vote for a different command d' if so does B. However, suppose that a configuration changing command is chosen that moves to configuration {A} at instance n'<n. It might appear as though A's vote on d suffices to choose d at instance n, but this could lead to inconsistency. Tagging messages with the configuration context resolves this issue, and re-instates a virtual synchrony principle within the Paxos framework.

Additionally, VS Paxos determines when a reconfiguration attempt has failed. A computing device, such as one of the computing devices 11 through 15 in FIG. 1, acts as a leader $l_2$ in VS Paxos and may propose values using the j'th configuration at command instance k if it can determine that the configuration at instance k is the j'th configuration. For that, there is no configuration-changing command by any previous computing device leader $l_0$ at instance lower than k using configuration j. This maintains safety. However, this is not sufficient to uphold progress. In some cases, leader $l_2$ determines that the j'th configuration is the configuration at instance k even if there has been a configuration-changing command by a previous leader $l_0$ at instance lower than k using configuration j. Specifically, such a reconfiguration attempt is deemed voided if a subsequent computing device leader $l_1$ proposed a command at instance higher than k using configuration j. Such a situation indicates that configuration j has lasted beyond command k, and voids the reconfiguration attempt by leader $l_0$.

With respect to a system model, a storage service provides a set of clients with a state machine implementation. There is an initial fixed value stored by the machine. A client operation may mutate the data and return a result. A replicated state machine comprises a set of servers that store the data and perform data operations uniformly in the same order. A client operation finishes when any of them returns a result. The computing devices 11 through 15 in FIG. 1 may act as a clients and/or servers, for example.

A replicated state machine is a storage system that stores an arbitrary object and comprises of a set of clients and a set of servers. Clients issue operations that mutate data stored by the replicated state machine. They receive responses to operations they issue from the state machine. Because the service is replicated and clients/servers communicate via messages passing over a network, the period elapsing from the issuance of an operation by one client to its completion may overlap the period for a different operation by another client. Furthermore, the messages involved with implementing such operations may arbitrarily interleave, get lost and re-sent, and so on. Nevertheless, a consistency criterion called linearizability is imposed, which guarantees data consistency. Linearizability stipulates that there is a global order of client operations, consistent with strict real-time precedence ordering, such that operations affect the data as if they occur one after the other according to their order.

Note that operations are not restricted in any way, allowing any type of data object to be implemented by the replicated state machine. Here, a consensus global order is given on operations, thus enabling linearizable implementation of arbitrary data types.

The set of servers may be further divided into two logical roles. Acceptors receive client requests and determine a consensus sequence of commands. Learners store copies of the date. They obtain the commands sequence and execute them on their local copies. As used herein, the term "server" may identify both of these roles, rather than acceptors and learners.

An implementation of VS Paxos is now described in further detail. Paxos implements a replicated state machine using a sequence of instances of a consensus algorithm, the i'th instance choosing the i'th command in the sequence. VS Paxos has a ballot number field included in certain messages, which is used for learning the commands chosen, as described further herein. An instance number may also be used in messages for disambiguation. A configuration number may be used in messages as well.

VS Paxos uses an instance of a genericized Synod protocol to determine a value for each instance designated by a pair (configuration number, instance number). Synod is a part of Paxos and is a well-known consensus protocol for pre-defined sets of servers, configuration sets, and quorum sets. Any two quorums should have at least one server in common. Every server has a value v to propose. An independent module is responsible for electing an eventually unique leader. While safety is maintained in face of multiple leaders, or of no leader at all, progress is guaranteed only when a unique leader emerges.

Paxos makes use of a set of ballot numbers. Each possible leader has its own disjoint set of ballot numbers, which can be achieved by placing a server identifier in the lower significant bits of a ballot number, for example.

Figure 5:
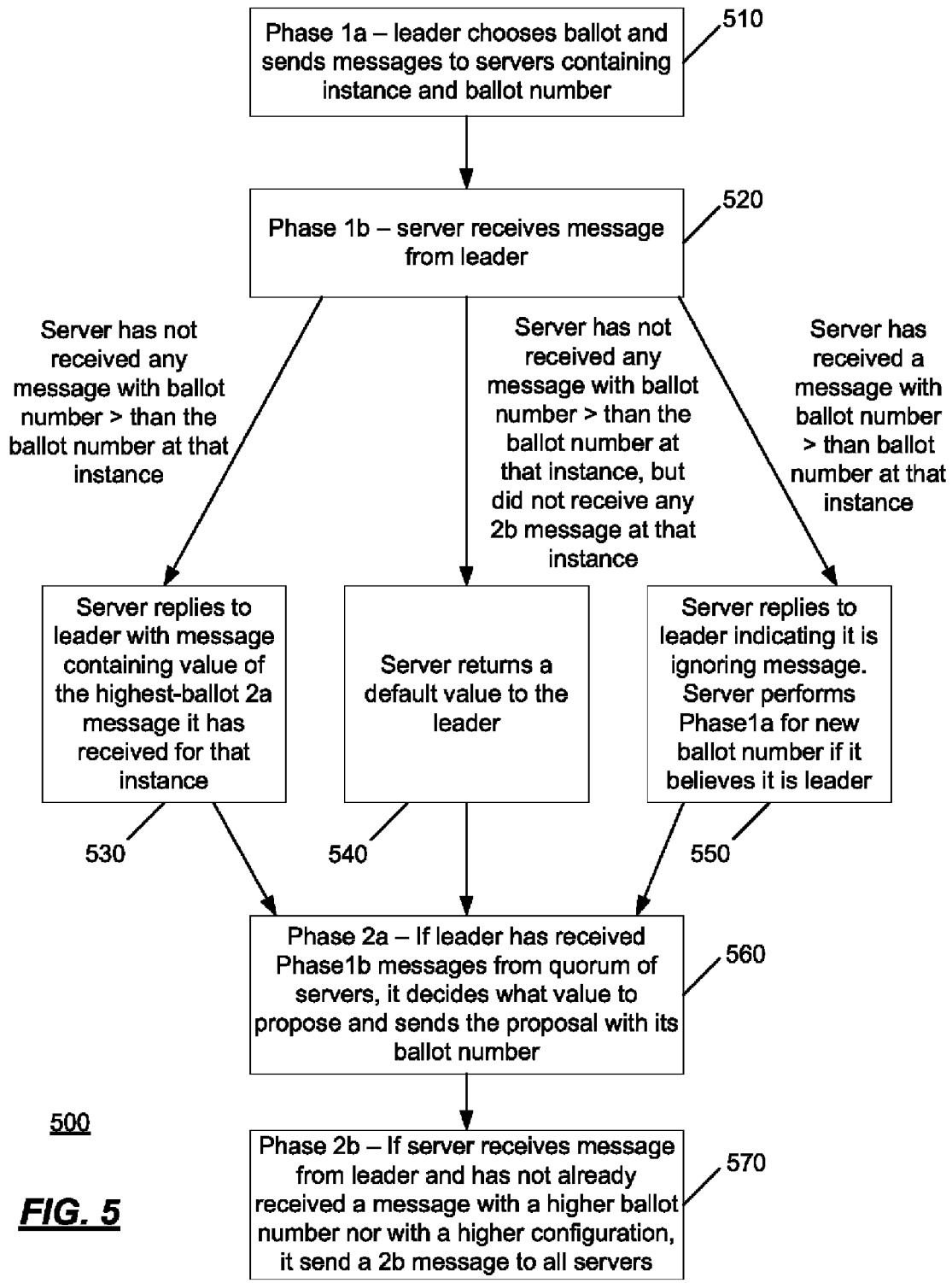
FIG. 5 is an operational flow of an implementation of a consensus method that may be used with Virtually Synchronous Paxos.

FIG. 5 is an operational flow of an implementation of the Synod consensus method 500 that may be used with Virtually Synchronous Paxos. The consensus method includes two phases, each with two sub-phases. At operation 510, in Phase 1a(c; ins; l; b), a leader l chooses a ballot b and sends (c; ins; 1a; b) messages to the servers.

At operation 520, in Phase 1b(c; ins; p; b), when server p receives a (c; ins; 1a; b) message from a leader l, it responds as follows. At operation 530, if it has not received any message with a ballot number greater than b at instance (c; ins), and it has not received a message at instance (c'; ins) where c'>c, then it replies to leader l with a (c, ins, 1b, b, (v' b')) message, where (v', b') is the value of the highest-ballot 2a message p received at instance (c; ins).

Alternatively, at operation 540, if it has not received any message with a ballot number greater than b at instance (c; ins), and it has not received a message at instance (c'; ins) where c'>c, but p did not receive any 2b message previously at this instance, a default value (ins, 1b, b, ($\perp,\perp$)) is returned.

Or, at operation 550, if p has received a message with ballot number greater than b at instance (c; ins), it sends a reply to leader l indicating that it is ignoring the (c; ins, 1a, b) message. Upon receiving that message, leader l will perform a Phase 1a(c; ins; l; b1) action for b1>b, if it still believes itself to be the leader. Or alternatively, if p has received a message with instance (c'; ins) where c'>c, if it still believes itself to be the leader, leader l will perform a Phase 1a(c'; ins; l; b) action.

At operation 560, in Phase 2a(c; ins; l; b), if leader l has received (c, ins, 1b, b, *) messages from a quorum of servers, then it sends a (c, ins, 2a, w, b) message to the servers. The proposed value w is the value v' of the highest ballot tuple (v', b') in the 1b messages it received, if any. Otherwise, w is the leader's value v. This action may not be performed twice for different values of w with the same b.

At operation 570 in Phase 2b(c; ins; p; v; b), if server p receives a (c, ins, 2a, v, b) message from leader l and it has not already received any message with a ballot number greater than b, nor with a higher configuration c'>c, it sends a (c, ins, 2b, b, (v, b)) message to all servers. Server p stores the tuple (v, b).

If a server has received (c, ins, 1b/2b, b, (v, b)) messages from a quorum of servers in c, then it learns that the value v has been chosen at instance ins. Such a protocol guarantees that only a single value is learned by any leader (agreement), and that this value was proposed by some leader (validity). Moreover, if there is a unique operation leader l that can communicate with a quorum of servers, then some value will eventually be chosen.

In the state machine approach, a set of servers executes commands submitted by clients. Clients send their requests to a leader. The leader receives client commands, and tries to get the i'th command to be chosen by the i'th instance of the Paxos consensus method. In VS Paxos, the set of servers and the quorums that determine the outcome of commands in the sequence are themselves determined by the state machine. The state machine also maintains information about the quorum set in each configuration. For simplicity, assume that majorities are used. Hence, the state machine maintains information on the configuration. An initial configuration $G_0$ is known to all.

In VS Paxos, during normal operation a leader need not wait for normal commands to complete, and may simultaneously act on an unbounded number of commands. Reconfiguration is performed by state machine commands. The quorum set used for instance (0, *) of the consensus algorithm is $G_0$. The quorum configuration user for instance (k, m) is determined by a configuration changing decision chosen in instance (k−1, $m_k$), where $m_k$<m. Any instance is enabled only when the quorum configuration for it is known.

If the (k−1, j) consensus decision contains a reconfiguration decision, it determines the configuration and the quorum sets from instance (k, j+1) and onward, until the next reconfiguration at some command (k, *).

Commands are executed in the following order: (0, 1), (0, 2), . . . , (0, $m_1$), (1, $m_1$+1), (1, $m_1$+2), . . . , (1, $m_2$), (2, $m_2$+1), . . . , where (j, $m_{j+1}$) contains a reconfiguration decision for all j. This may be thought of as a command sequence by omitting the first index, obtaining that a reconfiguration decision at k takes effect at k+1.

Figure 6:
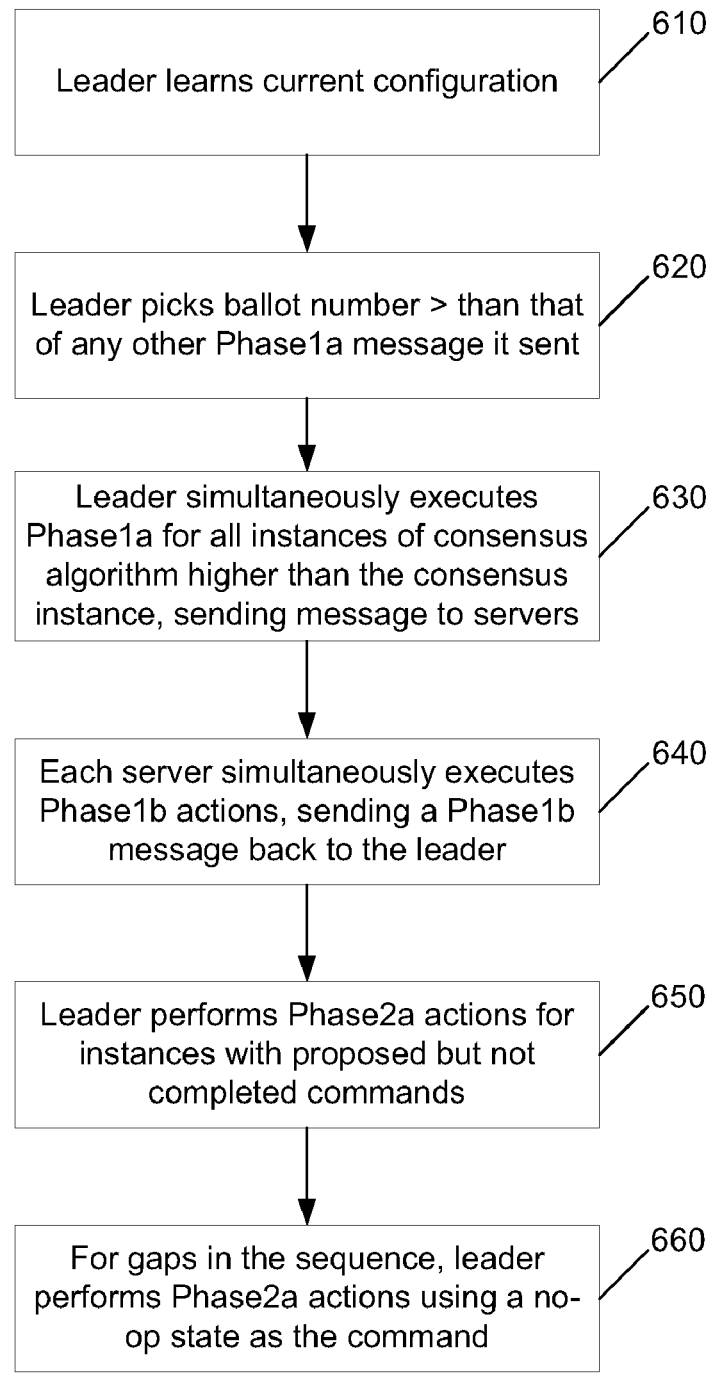
FIG. 6 is an operational flow of an implementation of a method of a new leader in Virtually Synchronous Paxos.

FIG. 6 is an operational flow of an implementation of a method 600 of a new server leader in Virtually Synchronous Paxos. The actions performed by a new server leader l in an implementation are described. The server leader learns the current configuration at operation 610. To this end, let $G_i$ be the latest configuration known to leader l. Denote by (j−1, $m_j$) the consensus instance that chooses $G_i$. Initially, the configuration which is known to a leader is $G_0$ and $m_{-1}$=0.

Server leader l picks a ballot number b at operation 620 that is larger than that of any other phase 1a message it sent, and iterates through operations 630 and 640. At operation 630, leader l simultaneously executes Phase 1a(j; ins; l; b) for all instances ins of the consensus algorithm from ($m_j$+1) and higher, by sending a single Phase 1a message to all the servers in $G_i$. At operation 640, each server then simultaneously executes Phase 1b actions in response to those virtual 1a messages, sending one Phase 1b message back to leader l with finite information on instances with non-$\perp$ values.

Server leader l learns from the responses the following: (1) determined commands, which are those where the same value and ballot is stored at a quorum of $G_i$, (2) proposed commands, which are those where value(s) are stored at some servers, and the value considered proposed is the one with highest ballot stored at any server, and (3) empty commands, which are those where all the servers in a quorum have no stored value.

For example, l may learn that after index $m_j$=100, commands 101, 102, 104, and 107 are determined; command 103 is proposed at some servers, but leader l does not have information indicating that it has completed at a full quorum; and 105, 106 and all commands higher than 107 appear empty at the accessed quorum. If all of the proposed commands contain normal operations, server leader l performs Phase 2a(j; ins; l; b) actions for instances ins with proposed, but not completed commands, at operation 650. For gaps ins in the sequence, it performs Phase 2a(j; ins; l; $G_i$; no op) actions at operation 660, using as the command a special no-op state machine command that does nothing. Note that these Phase 2's may be performed simultaneously in one round-trip message delay to/from a quorum of $G_i$. Even before the completion of these actions is known, leader l can resume normal operation and may start proposing at the next available consensus instance.

Another possibility is that leader l learns of some determined and/or proposed reconfigurations. For example, one server in the accessed quorum may report back of a proposed reconfiguration into $G_{i+1}$ at index 108. More abstractly, let $m_{j+1}$ be the first index of a proposed reconfiguration (j, *) (the proposal being $G_{i+1}$). Leader l learns the outcome of this decision before it progresses beyond index $m_{j+1}$. In this case, instead of operations 650 and 660 above, the leader performs one of the following operations, depending on the status of the $m_{j+1}$ command.

If there exist 1b messages (j, $m_{j+1}$, 1b, b', (($G_i \rightarrow G_{i+1}$), b')) for some ballot b'<b from a quorum of $G_i$, leader l learns that (j, $m_{j+1}$) is determined. In this case, it starts operation 610 over using $G_{i+1}$ as the latest configuration leader l has learned.

If 1b messages (j, $m_{j+1}$, 1b, $b_1$, ($G_i \rightarrow G_{i+1}$), $b_1$) exist for some ballot $b_1$<b from some servers in $G_i$, and there does not exist a 1b message (j, m', 1b, $b_2$, (v, $b_2$) with $b_2$>$b_1$ at an instance m'>$m_{j+1}$, then leader l learns that $G_{i+1}$ has been proposed. In this case, leader l performs Phase 2a(j, m, l, $G_i$, b) actions simultaneously for instances m not known to have completed up to and including $m_{j+1}$, using the commands determined by the 1b messages it received. For gaps in the sequence, it uses as the command v a special no-op state machine command that does nothing. The server waits for completion. After completion, it starts operation 610 over, having the configuration $G_{i+1}$ at (j, $m_{j+1}$) as the last known configuration.

If leader l learns that the proposed reconfiguration at $m_{j+1}$ has been voided, leader l treats $m_{j+1}$ as an empty index that contains no proposal. It re-executes operations 650 and 660 on the 'revised' set of proposed commands it has. It is noted that a reconfiguration proposal (j, $m_{j+1}$, 2a, $b_1$, ($G_{i+1} \rightarrow G_{i+1}$, $b_1$)) is voided if there exists a proposed command (j, m' 2a, $b_2$, (v, $b_2$)) at index m'>$m_{j+1}$, whose ballot satisfies $b_2$>$b_1$.

During normal operation, if a leader l proposes reconfiguration, it assigns to it some available consensus instance k and executes Phase 2a(j; k; l; b; c) for that instance using as the command c a reconfiguration proposal. It may not continue proposing decision values in the sequence (j, *) after position k. It learns that decision k has been determined before proposing decision values in the new configuration sequence (j+1, *). It then may propose values for decisions in the new configuration, at instance (j+1, k+1) and onward.

Note that when a leader proposes a reconfiguration decree at instance k, index k need not necessarily be the next available index. A leader may choose to allocate a reconfiguration command further ahead in the sequence. It may then keep doing Phase 2a actions up to k, and meanwhile, the reconfiguration command may become determined. This gives flexibility in choosing k close by for reconfigurations that are to occur quickly, such as adding new servers, or further ahead for reconfigurations that may occur lazily, such as the removal of a faulty server. This emulates the pipelining of commands in Reconfigurable Paxos, without a priori fixing the bound α.

In an implementation, a separate configuration master may make decisions on reconfigurations. Such an implementation may be considered to have two state machines. The first state machine is the same as described above, namely, the state machine that maintains some replicated data via an agreed sequence of decrees that include only normal data operations (no reconfigurations). This state machine is referred to as the data operations state machine (OM), and the sequence of decrees it executes is referred to as the operations sequence. The second state machine determines a unique sequence of configurations, and a leader for every index (the leader will use this index as its ballot). This is called the quorum configuration state machine (CM), and the sequence of configurations is referred to as the quorum sequence. Another way to think of the CM is as determining a consensus mapping C(●) from integers to quorum configurations. The CM assigns each ballot value a corresponding leader and quorum configuration. The quorum configuration state machine may be implemented by a replicated state machine.

Suppose that a leader l learns of a decree C(b), such that leader l is the designated leader for C(b). The new leader collects information about the latest commands in previous configurations. The new leader learns what is a possible decision for instance ins by reading the proposal for ins whose ballot is highest. This is similar to that in Static Paxos, except that different ballots correspond to different quorum configurations.

A leader could perform Phase 1a in all past configurations, C(1), C(2), . . . , C(b−1), in order to guarantee intersection with every lower ballot. In practice, it would even suffice to contact one set of servers that contains a quorum in every lower-ballot configuration. This would reduce the dynamic case to Static Paxos. However, doing so defies a purpose of reconfiguration, since it requires a leader to contact a quorum in every configuration that ever existed. Once a quorum of, e.g., C(1) dies, the technique is prevented from making progress.

A mechanism may be used to mark past configurations 'finished'. This may be performed by storing at each ballot b a command, such as XferComplete(b), when state has completely transferred into this ballot's configuration. This command is stored by the OM within the sequence of data operations, at any point in the sequence, but it does not mutate the replicated data. Rather, it serves as a hint for higher-ballot leaders that the state of any commands chosen by ballots smaller than b has been transferred to the C(b).

A new leader finishes any potentially uncompleted decisions and empty commands before issuing a XferComplete command. It sends a quorum in C(b) the Phase 2a messages for any unfinished instances. Subsequently, any ballot-hb leader, where hb>b, that obtains a Phase 1b response containing the XferComplete(b) command, learns about the chosen instances. Therefore, the ballot-hb leader will not need to go back further than C(b). Further, this means that when XferComplete(b) is initiated, Phase 2b has completed by a quorum of C(b), and information from preceding configurations has been effectively transferred to C(b) and there is no need to access a quorum in past configurations.

Note that a XferComplete(b) message tells a higher-ballot leader that state-transfer into C(b) has completed even if the message has reached only one server in C(b). In particular, the leader should not need to learn that a XferComplete(b) command was chosen. If a ballot-hb leader, where hb>b, obtains any Phase 1b response that contains XferComplete(b), it does not need to perform Phase 1a at C(j) for j<b. It knows that no command was chosen, or will be chosen using ballot j or lower which was not chosen by ballot j. A resulting method for a new ballot-hb leader is to execute Phase 1a(l; hb) in configuration C(hb), C(hb−1) and so on backward, until a XferComplete(b) command is found for b<hb. Then the leader may start proposing new commands at the next available consensus instance.

A description of the consensus protocol used for implementing the OM is provided. The protocol is similar to Synod, but differs from Synod in many aspects, such as the following, for example. The protocol assumes a known unique mapping C(●) from the integers (ballots) to configurations. Recall that a goal of Phase 1 is for a ballot-b leader to suspend activity in previous configurations and to collect state in them. To be standalone, Phase 2a is enabled only when 1b messages are obtains for ballot b from quorums in every configuration C(1), C(2),..., C(b−1). However, in the full protocol, some of these Phase 1 interactions can be omitted. Therefore, below, Phase 1 is parameterized with a target configuration C, and Phase 2 has no enabling pre-requisite.

Figure 7:
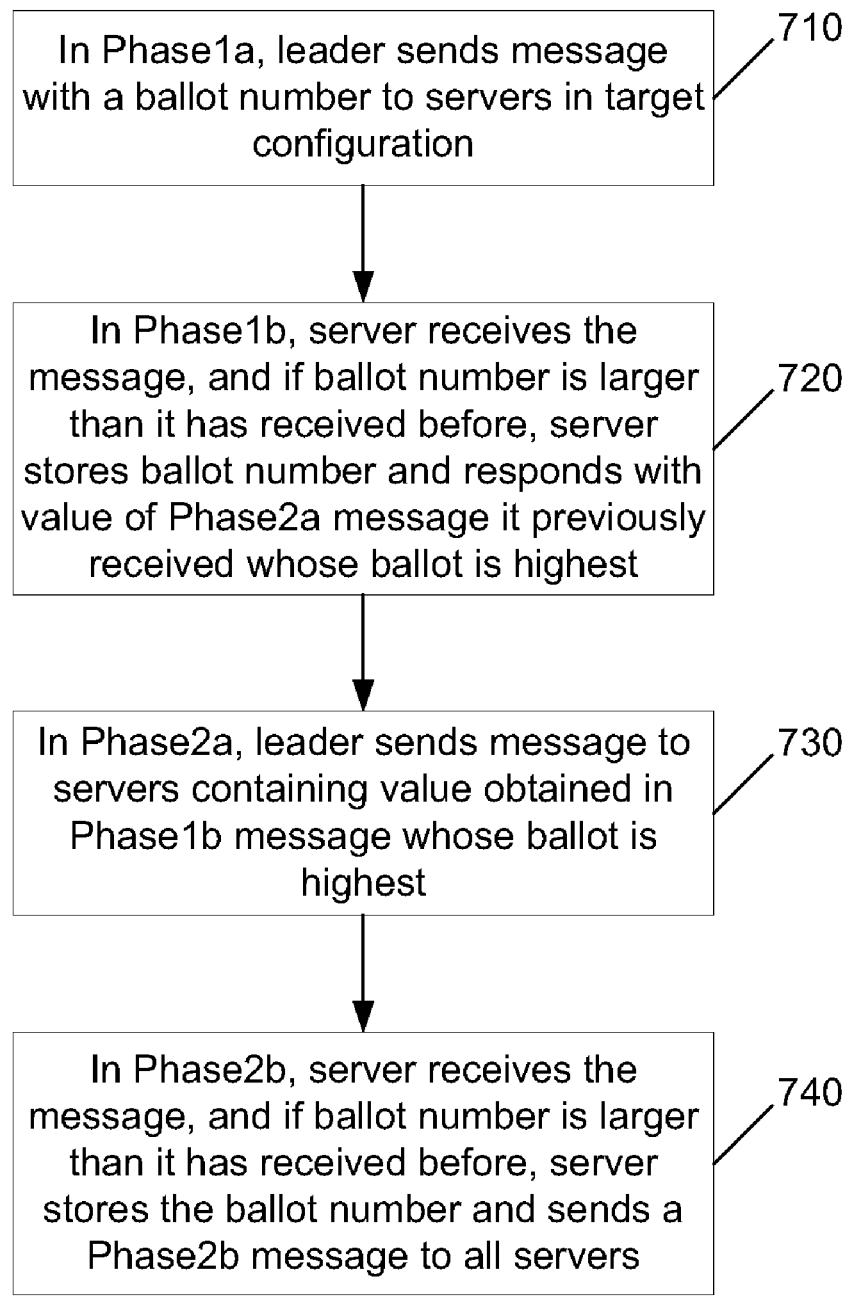
FIG. 7 is an operational flow of a method for implementing a data operations state machine.

FIG. 7 is an operational flow of a method 700 for implementing a data operations state machine. At operation 710, in Phase 1a(ins; l; b; C), a leader l sends (ins, 1a, b) messages to the servers in C. At operation 720, in Phase 1b(ins; p; b), when server p receives a (ins, 1a, b) message, if b is larger than any ballot value it received before, it responds with (ins, 1b, b, v) and stores b. The value v is the value of the 2a message it previously received whose ballot is highest, or ⊥ if none.

At operation 730, in Phase 2a(ins; l; b), the leader l sends a (ins, 2a, b, w) message to the servers in C(b). The proposed value w is the value obtained in a 1b message whose ballot is highest, or the leader's value if none. This action may not be performed twice for different values of w using the same ballot.

At operation 740, in Phase 2b(ins; p; v; b), if server p receives a (ins, 2a, b, v) message and if b is larger than any ballot value it has seen before, then p sends a (ins, 2b, b, v) message to all servers in C(b) and stores the value pair (v, b).

If a server has received (ins, 1b/2b, b, v) messages from a quorum of servers in C(b), then it learns that the value v has been chosen at instance ins.

Figure 8:
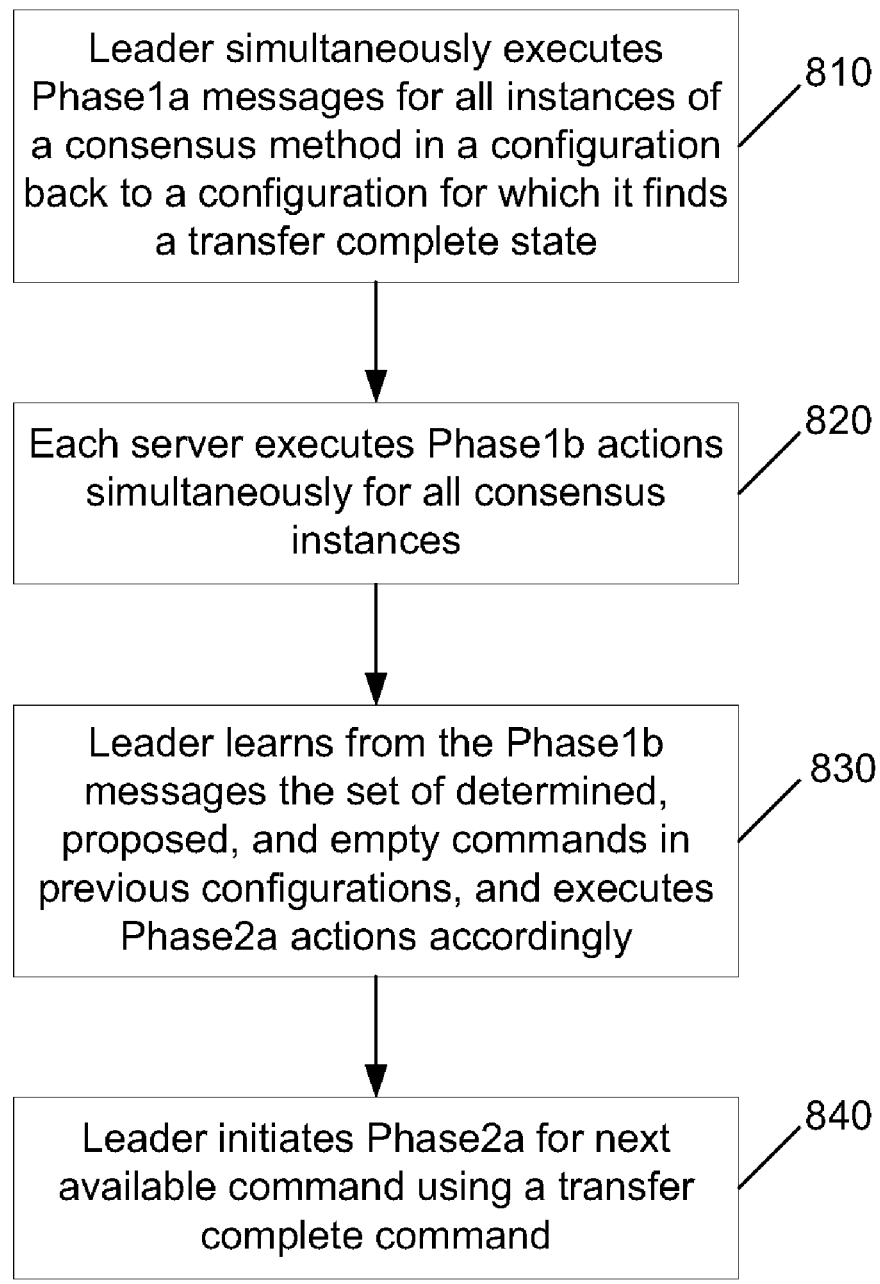
FIG. 8 is an operational flow of another method for implementing a data operations state machine.

FIG. 8 is an operational flow of another method 800 for implementing a data operations state machine. The protocol executed by a new leader is as follows.

At operation 810, a leader l simultaneously executes Phase 1a([1 . . . ∞]; l; b; C) for all instances ins of a consensus method in configuration C=C(b), then backward in C(b−1) and so on, back to a configuration C(j) for which it finds a XferComplete(j) proposal. This may be executed by incrementally by sending Phase 1a messages to servers in the union of previous configurations.

At operation 820, in response to those virtual Phase 1a messages, each server then executes Phase 1b actions simultaneously for all consensus instances, sending one Phase 1b message back to leader l with finite information on instances with actions.

At operation 830, the leader l learns from these responses the set of determined, proposed, and empty commands in previous configurations. It executes Phase 2a([1 . . . (ins(b)−1)]; l; b) actions simultaneously for the maximal prefix [1 . . . (ins(b)−1)] which ends in a non-empty instance. For the 2a values, it uses the commands determined by the Phase 1b messages it received. For gaps in the sequence, it uses as the command v a special no-op state machine command that does nothing. At operation 840, after the completion of operation 830, the leader l initiates Phase 2a(ins(b); l; b) for the next available command ins(b), using the special value XferComplete(b).

Operations 830 and 840 may be grouped together in one simultaneous action on all relevant instances. Simultaneity is crucial, as any server that stores XferComplete(b) also stores 2a messages from leader l regarding lower instances. Even before Phase 2 has completed in operations 830 and 840, the leader can resume normal operation and start proposing in configuration C(b) at ins(b) and onward.

In such an implementation, a leader of a new configuration needs to access only read quorums in previous configurations, and no write quorums need remain available. Here, the CM decisions are orthogonal to the OM decisions. In particular, progress in the OM is not suspended when a reconfiguration decision is made in the CM. Progress in the current configuration is suspended as soon as a new leader of a new configuration emerges and writes its higher ballot at a quorum of the current configuration.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for updating a fault tolerant state machine comprising a plurality of computing devices using a fault tolerant, quorum-based consensus protocol, comprising:
    a leader of the plurality of computing devices generating a first data state update for the state machine resulting from a first request from a first client operating on the state machine, where the first data state update comprises a first ballot number;
    the leader proposing the first data state update to the plurality of computing devices;
    the leader generating a second data state updates for the state machine resulting from a second requests from a second client operating on the state machine, the second data state update comprising a second ballot number;
    the leader proposing the second data state update to the plurality of computing devices prior to receiving a quorum of acknowledgements from the plurality of computing devices for the first data state update;
    the state machine implementing the first data state update, if the quorum of acknowledgements is received for the first data state update; and
    the state machine implementing the second data state update, if a quorum of acknowledgements is received from the plurality of computing devices for the second data state update.

2. The method of claim 1, the leader comprising a leader of a plurality of servers using a synod protocol.

3. The method of claim 1, comprising determining an ordering of the first data state update and the second data state update using the ballot numbers associated with respective updates.

4. The method of claim 3, the ordering used for one or more of:
   an ordering of the data state update proposals to the plurality of computing devices; and
   an ordering of the implementation of the data state updates on the state machine.

5. The method of claim 1, the computing devices comprising a plurality of servers in a data storage network implementing a Paxos-based consensus protocol.

6. The method of claim 1, comprising the leader sending a message to the plurality of computing devices comprising a leader ballot number chosen from a set of ballot numbers for the leader.

7. The method of claim 6, comprising receiving from a first computing device of the plurality of computing devices a message to the leader comprising a value of a highest ballot number received by the first computing device prior to receiving the message from the leader.

8. The method of claim 6, comprising receiving from a first computing device of the plurality of computing devices a message to the leader comprising a default ballot number value, if the first computing device has not received a message comprising a ballot number prior to receiving the leader's message.

9. The method of claim 6, comprising receiving from a first computing device of the plurality of computing devices a message to the leader comprising an indication that the first computing device is ignoring the message from the leader, if the first computing device has received a message comprising a ballot number higher than the leader ballot.

10. The method of claim 9, if the leader is configured to remain the leader of the plurality of computing devices, comprising one or more of:
    the leader responding with a message comprising a higher ballot number than the ballot number received by the first computing device; and
    the leader responding with a message comprising a higher message instance value than the ballot number received by the first computing device.

11. The method of claim 1, after the leader receives a quorum of acknowledgments from the plurality of computing devices, comprising:
    the leader sending a message to the plurality of computing devices comprising a proposed value to be learned by the state machine, comprising one of:
        a result of a function comprising at least one ballot tuple comprising a highest ballot tuple from one or more messages received from the plurality of computing devices, if at least one ballot tuple is received by the leader; and
        a value proposed by the leader; and
    one or more of the plurality of computing devices sending a message to the other of the plurality of computing devices, the message comprising a ballot number greater than a current active ballot number, and receiving information about the state of the other computing devices in return.

12. A method for reconfiguring a fault tolerant state machine comprising a plurality of computing devices using a fault tolerant, quorum-based consensus protocol, comprising:
    a first leader of the plurality of computing devices sending a message to the plurality of computing devices, the message comprising a state machine configuration update and a ballot number higher than a current ballot number used by a second leader for the state machine;
    one or more of the plurality of computing devices disabling the second leader by refusing messages comprising a ballot number lower than the first leader's;
    after receiving a quorum of acknowledgements from the plurality of computing devices, the first leader:
        generating a plurality of data state updates for the state machine resulting from a plurality of requests from one or more clients operating on the state machine, the respective plurality of data state updates comprising different ballot numbers; and
        proposing the plurality of data state updates to the plurality of computing devices without regard to receiving a quorum of acknowledgements for the respective plurality of data state updates; and
    the state machine implementing the one or more plurality of data state updates, if the quorum of acknowledgements is received for the respective plurality of data state updates.

13. The method of claim 12, disabling the second leader comprising refusing messages having a lower ballot number than a ballot number received by a computing device from the one or more of the other plurality of computing devices.

14. The method of claim 12, comprising the first leader collecting information on a state of remaining computing devices from the plurality of computing devices after proposing the configuration update.

15. The method of claim 14, comprising the remaining computing devices sending information on a previous command from the second leader, comprising a ballot number.

16. The method of claim 12, comprising the first leader determining a current configuration of the state machine utilizing a consensus decision based on a quorum set for the plurality of computing devices.

17. The method of claim 16, comprising the first leader:
    choosing a ballot number higher than the current ballot number determined from the current configuration state; and
    sending a message to the plurality of computing devices, the message comprising the chosen ballot number.

18. The method of claim 16, upon learning of the current configuration of the state machine the first leader proposing a new configuration of the state machine, where the proposal comprises a ballot number higher than a ballot number used in the current configuration.

19. The method of claim 12, the fault tolerant state machine comprising a data operations state machine and a quorum configuration state machine, the method comprising:
    the data operations state machine generating a plurality of decisions orthogonal to a plurality of decisions generated by the quorum configuration state machine, so that the data operations state machine continues operating when a reconfiguration decision is made by the quorum configuration state machine.

20. A method for updating and reconfiguring a fault tolerant state machine comprising a plurality of computing devices using a fault tolerant, quorum-based consensus protocol, comprising:
    a first leader of the plurality of computing devices generating a first data state update for the state machine resulting from a first request from a first client operating on the state machine, the first data state update comprising a first ballot number;
    the first leader proposing the first data state update to the plurality of computing devices;
    the first leader generating a second data state update for the state machine resulting from a second request from a second client operating on the state machine, the second data state update comprising a second ballot number;

the first leader proposing the second data state update to the plurality of computing devices prior to receiving a quorum of acknowledgements for the first data state update;

the state machine implementing the first data state update, if the quorum of acknowledgements is received for the first data state update;

the state machine implementing the second data state update, if the quorum of acknowledgements is received for the second data state update:

a second leader of the plurality of computing devices sending a message to the plurality of computing devices, the message comprising a state machine configuration update and a ballot number higher than a current ballot number used by the first leader for the state machine;

one or more of the plurality of computing devices disabling the first leader by refusing messages comprising a ballot number lower than the second leader's ballot number.

* * * * *